Aug. 25, 1964   A. J. BRILLIANTINE   3,145,596
APPARATUS FOR MAKING PRECISION THREADS
Filed Jan. 12, 1961   3 Sheets-Sheet 1

INVENTOR.
ARCHE J. BRILLIANTINE
BY
ATTORNEYS

Aug. 25, 1964  A. J. BRILLIANTINE  3,145,596
APPARATUS FOR MAKING PRECISION THREADS
Filed Jan. 12, 1961  3 Sheets-Sheet 2

INVENTOR.
ARCHE J. BRILLIANTINE
BY

ATTORNEYS

Aug. 25, 1964     A. J. BRILLIANTINE     3,145,596
APPARATUS FOR MAKING PRECISION THREADS
Filed Jan. 12, 1961     3 Sheets-Sheet 3

INVENTOR.
ARCHE J. BRILLIANTINE
BY,

ATTORNEYS

3,145,596
APPARATUS FOR MAKING PRECISION THREADS
Arche J. Brilliantine, Trenton, N.J., assignor, by mesne assignments, to De Laval Turbine Inc., Trenton, N.J., a corporation of Delaware
Filed Jan. 12, 1961, Ser. No. 82,262
4 Claims. (Cl. 82—5)

This invention relates to apparatus for making precision screws and the like wherein the lead of the threads must be highly accurate.

While the present invention is applicable to the manufacture of many types of precision threaded structures, for purposes of illustration this description will be directed to the manufacture of precision screws. Also, while this invention is applicable to many types of machine tools which have lead screws and are used for the manufacture of threaded structures, this description will be directed to the use of a lathe for cutting a precision thread. In the manufacture of precision screws by the use of a lathe or turning machine equipped with a lead screw for driving a carriage for the lathe cutting tool, it is desirable to minimize the effect of errors in the lead of the lead screw of the lathe. This lead screw error can accumulate to a considerable amount in the manufacture of screws having a length of the order of twenty feet or more.

It is the broad object of this invention to provide an apparatus for manufacturing precision screws, or similar structures, in which inaccuracies resulting from errors in the lead of the lead screw of the machine tool are minimized. Briefly stated, this object is accomplished by adjusting the relative position between the screw being manufactured and the carriage for the thread forming tool in a manner to compensate for the lead screw errors. More specifically, in accordance with the apparatus disclosed herein, the lead screw is moved axially by adjustment at its thrust bearing to effect the desired lead screw error compensation.

The above and other objects and features of the invention will become apparent from the following description read in conjunction with the accompanying drawings in which.

Figure 1:
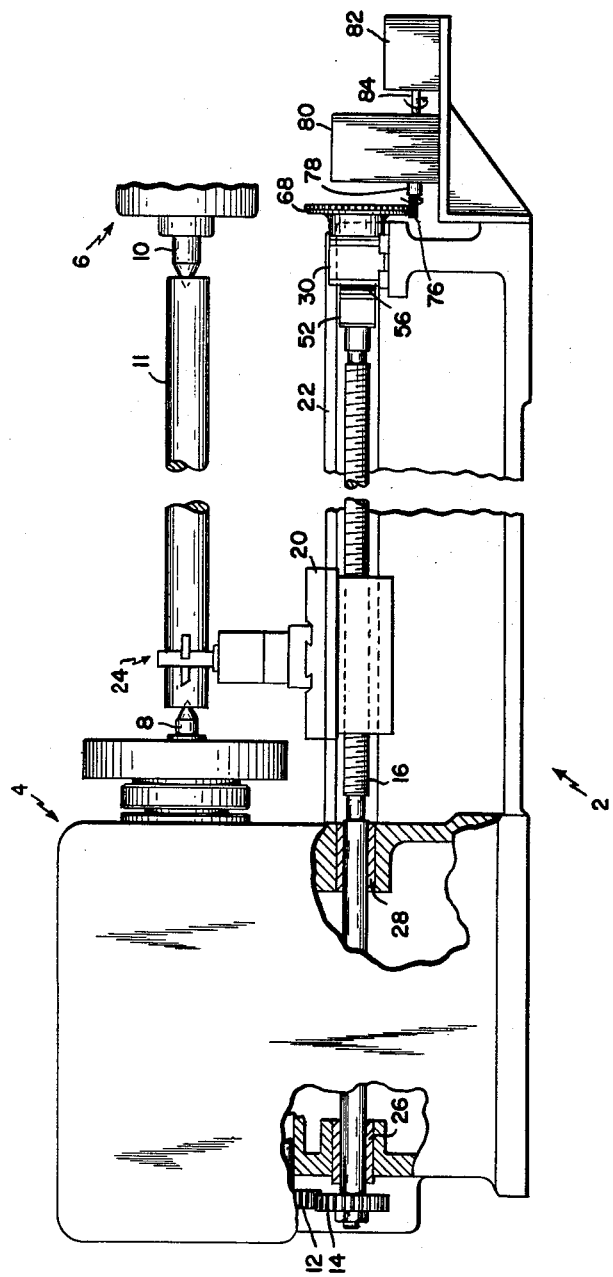
FIGURE 1 is an elevation view of a lathe comprising the lead screw error compensating means in accordance with this invention.
Figure 3:
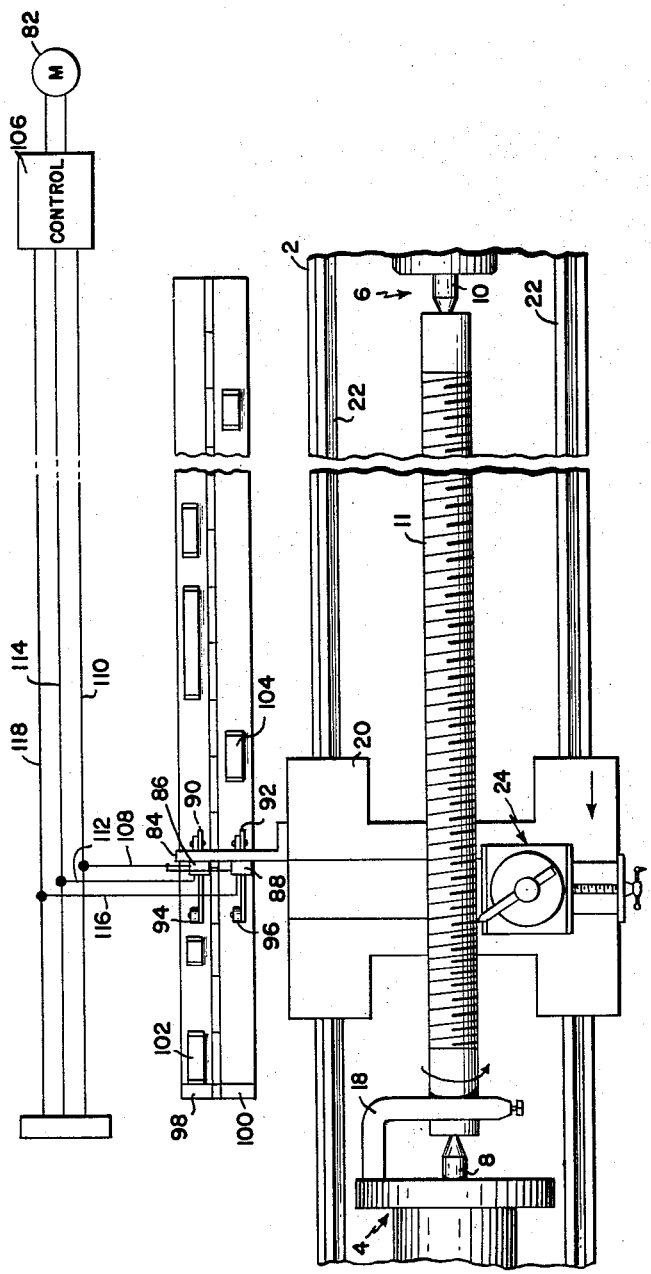
FIGURE 3 is a fragmentary plan view of a lathe comprising the compensating means in accordance with this invention.

Referring to FIGURE 1, there is shown a lathe, generally indicated at 2, which is constructed in the conventional manner with the exception of the modifications to be hereafter described. The lathe 2 comprises the conventional headstock 4 and tailstock 6 having centers 8 and 10, respectively, for supporting the work piece 11. The driving gear 12 driven by the change gears of the lathe is a spur gear and engages a spur gear 14 mounted on the headstock end of the lead screw 16 to drive the same. It will be noted that this driving arrangement of spur gears 12 and 14 permits axial movement of the lead screw 16. The work piece 11 may be driven by a single-tailed dog 18, as shown in FIGURE 3, or by any other suitable driving means.

The lathe 2 is provided with a conventional carriage 20 slidably mounted on the bed of the lathe and guided for reciprocating movement by suitable tracks 22. Carriage 20 threadedly engages the lead screw in the conventional manner to be moved along the lathe bed in accordance with the rotation of the lead screw 16. Carriage 20 carries a suitable thread cutting tool 24.

The headstock end of the lead screw 20 is journalled in bearings 26 and 28 mounted in the lathe frame. The tailstock end of the lead screw 20 is mounted in a housing 30 supported on the lathe frame. Housing 30 has a horizontal cylindrical bore 32 adapted to receive an annular member 34 which has an internal right-hand thread. An externally threaded annular member 36 threadedly engages member 34 and has a sleeve 38 mounted therein. The tailstock end of lead screw 16 is journalled within sleeve 38 which provides a bearing for the journal 40 of the lead screw 16.

Figure 2:
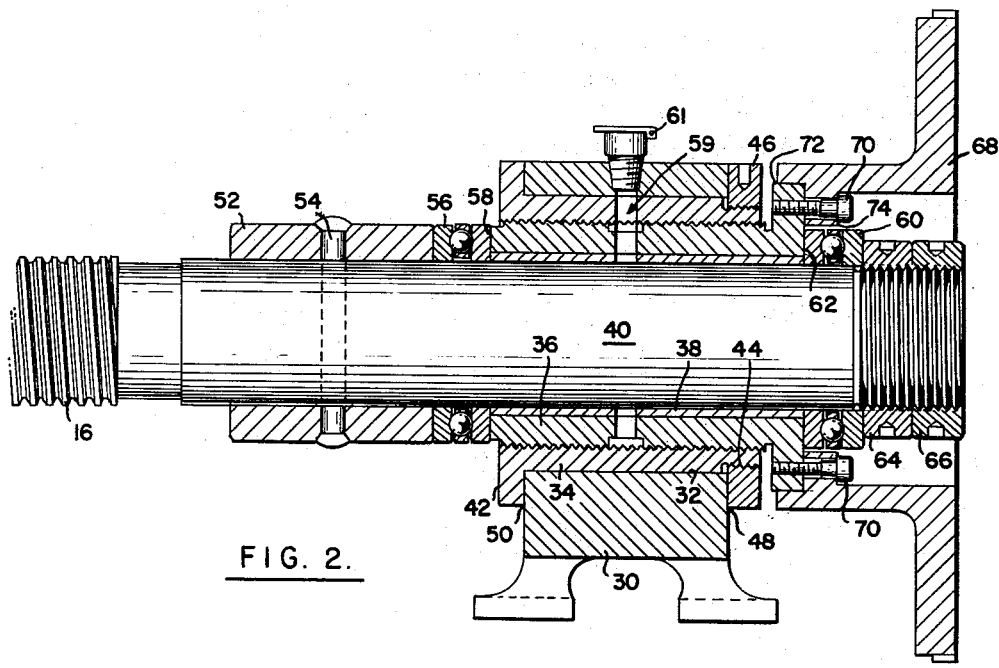
FIGURE 2 is an enlarged view of the compensating means shown in FIGURE 1.

The member 36 has an outwardly extending annular flange 42 formed on the left-hand end thereof and external threads 44 at the right-hand end thereof, as viewed in FIGURE 2. A lock nut 46 threadedly engages member 34 at threads 44 and is tightened onto member 34 to contact the wall 46 of housing 30 and move flange 42 into contact with the wall 48 of housing 30 to thereby clamp member 34 onto housing 30.

By reason of the clamping action of nut 46, member 34 will be retained against rotative movement. By reason of the threaded engagement between member 34 and member 36, member 34 holds member 36 in a fixed axial position which may be adjusted only by rotation of the member 36 within member 34.

A collar 52 is fixedly mounted in journal 40 inwardly of member 36 by a pin 54 extending diametrically through journal 40 and collar 52. A thrust bearing 56 is mounted on journal 40 between collar 52 and member 36 and is engageable with the inner end 58 thereof. A second thrust bearing 60 is mounted on journal 40 outwardly of member 36 and is engageable with the outer end 62 thereof. The lead screw 16 is threaded at the tailstock end thereof for engagement with a thrust nut 64 and a lock nut 66. Thrust nut 64 is threaded onto the outer end of lead screw 16 to clamp the thrust bearings 56 and 60 into contact with the inner and outer walls 58 and 62, respectively, of member 36 by the combined action of collar 52 and thrust nut 64. The lock nut 66 retains the thrust nut 64 in its clamping position as shown in FIGURE 2. By this arrangement, there can be no relative axial movement between the lead screw 16 and the member 36.

Thrust bearing 56 will carry a load acting to move the lead screw 16 to the right, as viewed in FIGURE 2, by reason of the contact between thrust bearing 56 and collar 52 which is fixed onto the lead screw 16 by pin 54. Thrust bearing 60 will carry a load acting to move the lead screw to the left, as viewed in FIGURE 2, by reason of the contact between thrust bearing 60 and thrust nut 64. By this arrangement, the load on the lead screw 16 will be carried by the thrust bearing arrangement during the cutting of either left-hand or right-hand threads. Also, axial movement of the member 36 toward the tailstock end will be transmitted to the lead screw 16 through thrust bearing 60 and thrust nut 64 and axial movement of the member 36 toward the headstock end will be transmitted to the lead screw 16 through thrust bearing 56 and collar 52.

Suitable lubrication passageways, indicated generally at 59 are provided to permit lubrication of the journal 40 within bearing 38. An oil cup 61 mounted on housing 30 for communication with the passageways 59 permits the addition of the lubricating fluid.

Means are provided for causing axial movement of member 36. To this end, member 36 is fixedly connected to a spur gear 68 by a plurality of bolts 70 acting through cooperating flanges 72 and 74 on member 36 and gear 68, respectively. Bolts 70 project through openings in flange 74 for threaded engagement with threaded holes in flange 72.

The teeth of gear 68 engage the teeth of a spur gear 76 fixedly mounted on the output shaft 78 of a gear reduction unit 80 supported on the lathe frame. Spur gears 68 and 76 will permit relative axial movement therebetween to accommodate the axial movement of gear 68 with member 36. Gear 68 has many more teeth than gear 76 so that the former is rotated a relatively small angular distance for one revolution of gear 76. A constant speed, reversible motor 82 is arranged to drive the gear reduction unit 80 through the motor shaft 84. Reversible motor 82 may be of any suitable type which will operate at a constant speed in either direction.

The rotation of the motor shaft 84 is transmitted through the gear reduction unit 80 and gear 76 to the gear 68 which, in turn, causes rotation of member 36. Since member 36 threadedly engages fixed member 34, this rotative movement causes axial movement of member 36 in either direction in accordance with the direction of rotation of gear 68. This axial movement is transmitted to the lead screw 16 through the thrust bearings 56 and 60 as previously described. This axial movement is accommodated at the headstock end of the lead screw since the gears 12 and 14 are spur gears. Also, spur gears 68 and 76 permit relative axial movement therebetween to accommodate the axial movement of gear 68 with member 36.

The errors in the lead of the lead screw 16 which are to be compensated by the apparatus in accordance with this invention are due to the variation between the actual lead of the lead screw and the theoretical lead thereof. These errors may occur over portions of the lead screw length and are, of course, cumulative over the entire length of the lead screw. These errors in the lead screw are transmitted to the screw being cut by the carriage of the lathe which is driven by the lead screw. Since there is some lost motion between the carriage and the lead screw, the error in the screw being cut may be greater or less than the error of the lead screw. Hence, the compensation for the lead screw error may be accomplished more effectively if compensation is made for the errors as measured at the carriage.

One method of determining lead screw error in accordance with this objective of compensating for the error in the travel of the carriage is to measure the actual travel of the carriage for a predetermined number of revolutions of the lead screw and compare this with the theoretical travel. The theoretical travel may be represented by a very accurately machined distance block. The compensation measurement is made over a plurality of intervals along the length of the lead screw, a suitable interval being six inches.

Although many methods may be employed to compare the actual carriage travel with a theoretical carriage travel, one such method is to gear the lathe for four pitch so that one revolution of the spindle will theoretically make the carriage travel one quarter of an inch. Hence, twenty-four revolutions of the spindle will cause a theoretical carriage travel of six inches. The revolution of the spindle may be accurately effected by providing a face plate on the lathe which face plate has a marking thereon cooperable with a fixed zero marking. The carriage is placed to a starting position at the headstock end of the lathe with the indicator marking on the face plate in a zero position. A six inch distance block, which is used to represent the theoretical travel, is positioned with one end in accurate alignment with the starting position of the carriage by the use of suitable gauges. These gauges must provide very high accuracy of measurement since the accuracy desired for the screw to be cut will be of the order of one-thousandths of an inch. Suitable electronic and mechanical indicators of such high accuracy are well known in the art.

After placing the apparatus in the starting position, the face plate is rotated through twenty-four revolutions. The position of the carriage is then compared with the six inch distance block by the gauges which will indicate whether the carriage travel is greater than, equal to, or less than the theoretical six inches. The distance block is then set to zero again and face plate is rotated through twenty-four revolutions and the above comparison of the actual and theoretical travel is repeated.

By repetition of the above procedure for six inch intervals along the length of the lathe, a plot may be made of the deviation in travel of the carriage from the theoretical travel for each six inch interval. Hence, it can be determined how much the lead screw should be adjusted axially over each of the intervals to compensate for the error in the lead. If, for example, the carriage has travelled .0005 inch greater than the theoretical distance over an interval, in order to correct for the error in this interval, the lead screw should be adjusted axially .0005 inch over this interval in a direction opposite to the direction of carriage travel. Hence, the lead screw should be moved to retract the carriage. If, on the other hand, the carriage has travelled .0005 inch less than the theoretical travel over a particular interval, the lead screw should be adjusted axially .0005 inch in the direction of carriage travel, i.e., the lead screw must be moved to advance the carriage.

It will be apparent that by axial adjustment of the lead screw to place the carriage in a position corresponding to the theoretical lead at the end of each six inch interval, the error of the lead screw will be compensated. Thus, there will be no cumulative error in the screw being made and this screw will have a more accurate lead than the lead screw of the lathe.

Means are provided for driving the motor 82 to axially adjust the lead screw 16 to compensate for errors in the lead of the lead screw as determined by the above described procedure. To this end, a support 84 is mounted on the carriage 20 and carries a pair of micro-switches 86 and 88. A pair of arms 90 and 92 are pivotally mounted at one end thereof on support 84 and carry rollers 94 and 96, respectively, on the other end thereof. Rollers 94 and 96 are arranged to ride on a pair of tracks 98 and 100, respectively. A plurality of cams 102 and 104 are positioned on tracks 98 and 100, respectively, in a manner to be more fully described hereafter. When rollers 94 and 96 ride on the portion of tracks 98 and 100 where there are no cams, the arms 90 and 92 will be in a lower position and the switches 86 and 88 will be in their normally open position. However, when one of the rollers 94 and 96 rides to one of the cams 102 and 104, respectively, the arm of this roller will be moved upwardly to close its respective switch 86 or 88.

Switches 86 and 88 are electrically connected to a control 106 for the reversible motor 82. The electrical circuitry for this connection to control 106 is diagrammatically shown in FIGURE 3 and comprises a conductor 108 connected between switches 86 and 88 and a transmission line 110 which is connected to the control 106, a conductor 112 connected between switch 86 and a transmission line 114 which is connected to the control 106, and a conductor 116 connected between switch 88 and a transmission line 118 which is connected to the control 106. Conductors 108, 112 and 116 are mounted for movement with bracket 84 and by suitable contacts at the ends thereof for electrical connection with the transmission lines 110, 114 and 118 during carriage travel. Since FIGURE 3 is a diagrammatic representation of the electrical circuitry, there has been omitted details of the construction thereof such as the protective structure for the transmission lines and the connections between the conductors and the transmission lines. It will be understood, however, that such structure is well-known in the art and need not be described herein.

When switch 86 is closed by the action of a cam 102 and arm 98, a circuit will be completed from the control 106 through line 110, conductor 108, conductor 112, and line 114 back to the control 106. The completion of this circuit will cause operation of motor 82 in one direction. When switch 88 is closed, by the action of a cam 104 and arm 92, a circuit will be completed from the control 106 through line 110, conductor 108, switch 88, conductor 116 and line 118 back to the control 106. The completion of this circuit will cause operation of motor 82 in the reverse direction.

Figure 4:
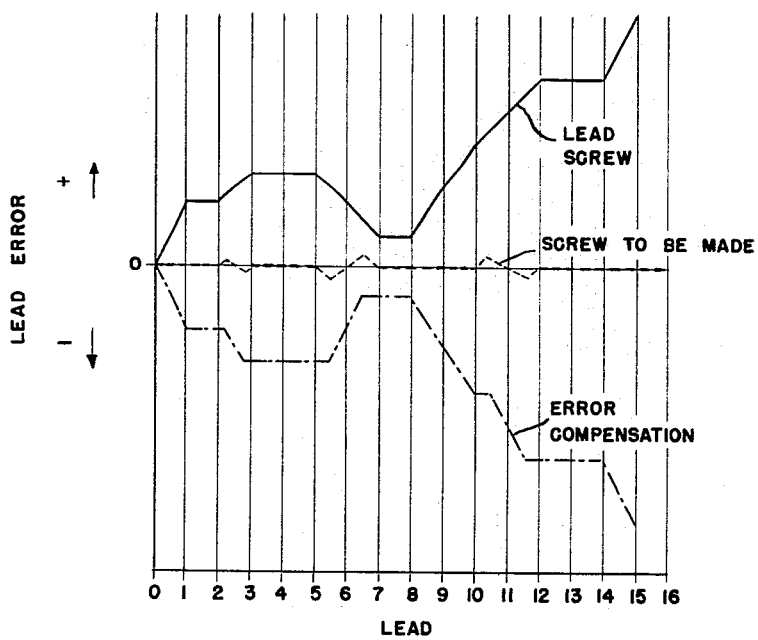
FIGURE 4 is a graphic representation illustrating the manner in which compensation of the lead spring error may be accomplished.

An example of the plot of the errors in the lead screw is shown in FIGURE 4 wherein the ordinate represents the deviation from the theoretical lead and the abscissa represents the intervals at which the deviations were measured along the length of the lead screw. When the actual lead of the lead screw is greater than the theoretical lead, this deviation is plotted in an upward direction as is indicated by the positive sign. On the other hand, when the actual lead of the lead screw is less than the theoretical lead, this deviation is represented by the negative sign. Hence, a perfect lead screw will be represented by the axis of the abscissa.

A typical plot of the lead screw error as measured at the carriage, is shown in FIGURE 4 and is marked accordingly. It will be noted that this curve represents the accumulation of the lead error. Also, the portions of the curve between each interval illustrate the deviation occuring at that interval, a positive deviation being plotted with a positive slope and a negative deviation being plotted with a negative slope in accordance with the amount of the deviation.

The error compensation curve represents the manner in which the compensating means should be theoretically operated to compensate for the error in the lead screw. Thus, if there is a positive error in a particular interval the compensating means must be operated to adjust the lead screw to retract the carriage to offset or compensate for this positive error. It is noted that the compensating means is operated at constant correction rate by reason of the use of a constant speed motor. Hence, the slope of the portion of the error correction curve representing operation of the compensating means will at all times be the same except, of course, for the sign thereof. The correction rate varies in accordance with the speed of motor 82 and the reduction of gearing unit 80 is chosen so that it will be greater than the maximum possible correction rate ever required. Since the slope illustrative of the correction rate will not be the same as the slope of the error, the compensation means is operated in step-by-step manner in order to approximate an exact correction. This mode of operation is illustrated by reference to the interval between numbers 5 and 7 where the correcting action is only applied over a portion of this interval to provide the desired compensation. Of course, the compensation means is not operated when there is no need for compensation as, for example, in the interval between the numbers 3 and 5.

It will be apparent that the theoretical error in the screw to be made will be represented by a curve which is the summation of the lead screw error curve and the error correction curve. This curve is illustrated in FIGURE 4, is marked accordingly and illustrates the effect of the compensation means in accordance with this invention. The error compensation curve also illustrates the manner in which the cams 102 and 104 should theoretically be constructed and on which of the tracks 98 and 100 these cams must be placed. Accordingly, whenever compensation is required for a positive error, a cam is place in track 98 and whenever compensation is required for a negative error, a cam 104 is placed in the track 100, this arrangement being in accordance with the direction of motor rotation as hereafter described. The length of the cams 102 and 104 depends upon the length of time the motor must be operated to bring about the desired correction. Thus, between interval 0–1 a cam must be placed in track 98 and it must extend the entire length of this interval. However, between interval 5–7 a cam must be placed in track 100 and this cam must extend over only a portion of the interval length.

In the operation of the apparatus in accordance with this invention, with the cams 102 and 104 properly positioned on the tracks 98 and 100, the compensation means will be operated to adjust the lead screw 16 in the desired axial direction. When the lathe is set up as shown in FIGURE 3 with the carriage being driven from right to left by the lead screw, the lead screw 16 must be adjusted toward the right to retract carriage 20 to compensate for a positive error (i.e., when the actual lead is greater than the theoretical lead) and to the left to advance carriage 20 to correct for a negative error (i.e., when the actual lead is less than the theoretical lead). Thus, in order to correct for a positive error, the switch 86 is closed by reason of roller 94 riding on a cam 102 in the track 98. This completes a circuit through control 106 which causes the motor 82 to rotate in a direction to drive the shafts 84 and 78 to cause counterclockwise rotation of the compensator gear 68, as viewed from the right side of FIGURE 2, by the action of gear 76. Counterclockwise rotation of gear 68 is transmitted to member 36 which is accordingly moved axially toward the right by reason of its threaded engagement with fixed nut member 34 which has right-hand threads. This axial movement of member 36 toward the right is transmitted to the lead screw 16 by thrust bearing 60 and the nuts 64 and 66, the lead screw 16 transmitting this movement to the carriage 20. It will thus be apparent that movement of the lead screw to the right will compensate for a positive error since this movement reduces the effective lead of the lead screw and the actual travel of the carriage with respect to the work piece.

In order to correct for a negative error, the switch 88 is closed by reason of the roller 96 riding on a cam 104 in track 100. This completes a circuit through control 106 which causes rotation of motor 84 in a direction to cause clockwise rotation of the compensating gear 68 as viewed from the right side of FIGURE 2. This clockwise rotation of gear 68 is transmitted to member 36 which is moved toward the left by reason of its threaded engagement with fixed nut member 34. This axial movement of member 36 to the left is transmitted to the lead screw 16 by thrust bearing 56, collar 50 and pin 54, the lead screw movement being transmitted to the carriage 20. It will be apparent that this movement of the lead screw to the left will compensate for a negative error since this movement increases the effective lead of the lead screw and the actual travel of the carriage relative to the work piece.

An advantage of the compensating means in accordance with this invention is that the compensating movement of the lead screw is only effected at intervals along the lead screw length whereat an error occurs. Hence, where there is no error, there is no lead screw adjustment. Thus, the apparatus in accordance with this invention provides a more accurate compensation than an apparatus which makes an overall adjustment to compenste for the cumulative lead screw error since this form of compensation would involve lead screw adjustment where none is required and would accordingly produce an error in the lead of the work piece. By the apparatus herein disclosed, the error compensation is made directly at the location of the error.

By varying the relative position between the carriage and the work piece in the above-described manner, compensation for the lead screw error is effected. While the above-described apparatus involves means for axially adjusting the lead screw at the tailstock end thereof, it is to be understood that other forms of compensating means may be provided to effect this relative movement between the carriage and the work piece. For example, means may be provided for varying the gear change or the carriage may be provided with an adjustable nut which could be shifted to effect the desired carriage compenstating movement.

It is thus to be understood that the invention is not to be limited to the exact apparatus and arrangement described herein since modifications thereof may be suggested by those skilled in the art without departing from the scope of the invention. Hence, it is not desired to be limited except as required by the following claims.

What is claimed is:

1. Apparatus for machining threads in a work piece comprising a machine tool having means for supporting the work piece, a carriage for a tool to machine the threads and a lead screw for advancing said carriage to cause machining of the threads, means operable in response to advancement of said carriage axially adjusting said leading screw through definite set amounts to compensate for errors in the lead of said screw, said means for axially adjusting said lead screw including a thrust bearing for said leading screw for carrying loads in either axial direction and a movable member cooperable with said thrust bearing to move the same along said lead screw axis, said thrust bearing movement causing a corresponding movement of said lead screw, means for moving said member including a reversible motor having an output shaft rotatable in either direction and means for moving said member to cause lead screw axial movement in one sense in response to rotation of said shaft in one direction and to cause lead screw movement in the opposite sense in response to rotation of said shaft in the opposite direction, said last-mentioned means including a threaded mounting for said member and an operative connection between said shaft and said member for rotating said member within said mounting, said motor being a constant speed motor, and means for intermittently energizing said motor to cause step-by-step compensation of said lead screw error.

2. Apparatus as claimed in claim 1 wherein said energizing means comprises control means for causing operation of said motor in either direction including a pair of switches mounted for movement with said carriage, said switches being electrically connected to said motor for controlling said reversible operation thereof, and means contacting said switches during movement thereof with said carriage to actuate said switches between open and closed positions to cause said lead screw error compensation.

3. Apparatus as claimed in claim 2 wherein said means for actuating said switches comprises a plurality of cams positioned on tracks along the path of carriage travel and means carried by said carriage contactable with said cams to cause said actuation of said switches.

4. Apparatus for machining threads in a work piece comprising a machine tool having means for supporting the work piece, a carriage for a tool to machine the threads and a lead screw for advancing said carriage to cause machining of the threads, means operable in response to advancement of said carriage axially adjusting said leading screw through definite set amounts to compensate for errors in the lead of said screw, said means for axially adjusting said lead screw including a thrust bearing for said leading screw for carrying loads in either axial direction and a movable member cooperable with said thrust bearing to move the same along said lead screw axis, said thrust bearing movement causing a corresponding movement of said lead screw, and means for moving said member including a reversible motor having an output shaft rotatable in either direction and means for moving said member to cause lead screw axial movement in one sense in response to rotation of said shaft in one direction and to cause lead screw movement in the opposite sense in response to rotation of said shaft in the opposite direction, said last-mentioned means including a threaded mounting for said member and an operative connection between said shaft and said member for rotating said member within said mounting, and means for intermittently energizing said motor to cause step-by-step compensation of said lead screw error.

References Cited in the file of this patent
UNITED STATES PATENTS

| 2,021,531 | Bath et al. | Nov. 19, 1935 |
| 2,491,403 | Wills | Dec. 13, 1949 |

FOREIGN PATENTS

| 170,165 | Great Britain | May 11, 1921 |